United States Patent [19]
Abe

[11] 3,776,746
[45] Dec. 4, 1973

[54] PROCESS FOR MANUFACTURE OF RIGID FOAMS

[76] Inventor: Kinichi Abe, 633, 1-chrome, Kasugijrnya-machi, Kawasaki, Japan

[22] Filed: June 1, 1971

[21] Appl. No.: 148,990

[30] Foreign Application Priority Data
  June 4, 1970 Japan.................................. 45/48252
  June 26, 1970 Japan.................................. 45/55209

[52] U.S. Cl..................................... 106/75, 106/84
[51] Int. Cl............................................. C04b 31/00
[58] Field of Search....................... 106/75, 85, 40 R

[56] References Cited
UNITED STATES PATENTS

| | | | |
|---|---|---|---|
| 3,136,645 | 6/1964 | Dess | 106/75 |
| 3,508,940 | 4/1970 | Webb | 106/75 |
| 3,547,839 | 12/1970 | Tocker | 106/75 |

*Primary Examiner*—James E. Poer
*Attorney*—Irving M. Weiner

[57] ABSTRACT

A process for the manufacture of a rigid foam out of a slurry containing an alkali silicate, or foaming agent, a substance which produces a gradual reaction with the alkali silicate, and other additives. It is essential that dinitrosopentamethylenetetramine be included in the slurried mixture. Such an undesired decomposition residuum as formaldehyde that may be produced by this compound is removable either by the combined use of a ureal substance or by an additional heat treatment of the slurry. To be turned into a rigid foam, this slurry is agitated at a temperature less than the boiling point thereof, succeedingly foamed and hardened, and dried.

16 Claims, No Drawings

3,776,746

PROCESS FOR MANUFACTURE OF RIGID FOAMS

The present invention relates generally to the manufacture of foams or lightweight cellular materials, and more specifically to an improved process for the manufacture of rigid foams from a slurry containing an alkali silicate. The rigid foams so produced may be used in heat insulation, lamination, filtering, and a number of other applications.

BACKGROUND OF THE INVENTION

There have been known various processes for the production of inorganic foams in which a powdered metal that will evolve a hydrogen gas, for example, is added to an alkali silicate. The alkali silicate may be mixed with powdered aluminum as the foaming agent together with other additives to provide a rigid foam that is used most suitably as heat insulating or refractory materials. These known processes are employed almost unexceptionally for field works. The products obtained, however, have a serious drawback in that they soften when moistened.

I have conducted various experiments to make the discovery that this drawback is eliminable by use of an organic foaming agent, dinitrosopentamethylenetetramine, which is generally used for formation of foamed rubber, vinyl chloride, and so forth. When used with an alkali silicate this agent will produce a decomposition residuum, such as formaldehyde, which gives off a pungent, offensive odor. My further experiments, however, have proved that this disadvantage can be overcome by the combined use of a ureal substance or by an additional heat treatment.

The foams produced according to the mentioned prior processes are so frail that they can never be securely nailed, nor can they be firmly bonded with conventional adhesives. These are only a few of the reasons why, as previously mentioned, the prior processes are fit for field works only and not for foam manufacture at factories. Moreover, the products themselves are narrowly limited in their applications.

SUMMARY OF THE INVENTION

The present invention provides a process for the manufacture of a foam which comprises the steps of making a slurry of a mixture including an alkali silicate, a foaming agent, dinitrosopentamethylenetetramine, a substance which produces a gradual reaction with the alkali silicate, and water. The aforementioned slurry is then agitated. The slurry is then foamed and hardened. Thereafter, the hardened foam is dried.

Accordingly, it is an object of the present invention to provide a new and improved process for the manufacture of rigid foams that are superbly suitable for use as heat insulating, filtering, and other materials.

Another object of the invention is to provide a process for the manufacture of foams which is adaptable both for field works and at factories.

Another object of the invention is to provide a process for the manufacture of foams having so improved physical and chemical properties that they permit nailing and bonding by means of organic adhesives.

It is still another object of this invention to provide a process for the manufacture of foams wherein dinitrosopentamethylenetetramine, known as a foaming agent for rubber, vinyl chloride and the like, is used in addition to any one of preselected foaming agents, whereby the foams obtained will not soften even when moistened.

A further object of the invention is to provide a process for the manufacture of foams wherein undesirable decomposition residuums of dinitrosopentamethylenetetramine in use, which will be produced in the process of manufacture, are successfully eliminated.

It is a still further object of the invention to provide a process for the manufacture of foams having uniformly fine gas bubbles for improved overall performance characteristics and a wider field of application.

DETAILED DESCRIPTION OF THE INVENTION

The novel features that are considered characteristic of the present invention are set forth in the appended claims. The invention itself, with its various ancillary objects and advantages, however, will be best understood from the following detailed description together with some practical Examples of the manufacturing process.

The following substances are selectively employed for the process of the invention:

1. Foaming agent:

Linear alkyl sulfate (for example, Lion Detergent 80, manufactured by Lion Yushi K.K., of Tokyo, Japan), sodium alkylaryl sulfonic acid, sodium dodecylbenzene sulfonic acid, ester of a fatty acid, or other water soluble surface active agents.

2. Alkali silicate:

Alkali silicate, or usually sodium silicate, having a ratio of $Na_2O$ to $SiO_2$ ranging between about 1 : 2 and 1: 4.2, is preferable. Potassium silicate, lithium silicate or the like is also employable.

3. n,n'-dinitrosopentamethylenetetramine:

This is used extensively as a foaming agent for rubber, vinyl chloride and the like, and is available in the form of yellowish powder. It is usually abbreviated as DPT, and will be referred to by this shortened form throughout the remainder of the specification.

4. Substance which produces a gradual reaction with alkali silicate:

Sodium silicofluoride, potassium silicofluoride, lithium silicofluoride, or other silicofluorides of alkali metals. Light burned magnesia (MgO), ammonium phosphate, ammonium oxalate, etc., are also employable.

5. Ureal substance:

Urea itself or its derivatives, including metamelamine and the like substances. This will serve to eliminate the undesired decomposition residuums (such as formaldehyde) of the DPT, and render the products bondable by means of organic adhesives. Activated charcoal is also employable for deodorization. Purely for this latter purpose, a heat treatment may be substituted for the use of such ureal substances, as hereinafter described in detail.

6. Fibers:

Inorganic fibers, such as those of asbestos, amosite and glass; or organic fibers, such as those of nylon, polypropylene, and like materials. These will add strength to the products.

7. Powdered substance:

Powdered alumina, kaolinite, quartzite, quartz or the like.

According to the present invention, a mixture of the foregoing substances suitably combined is mixed with water to form a slurry, in which the following reactions take place:

Sodium silicate is first hydrolyzed according to the formula:

$$3Na_2SiO_3 + 6H_2O = 6NaOH + 3H_2SiO_3$$

The hydrolyzed alkali silicate reacts with a substance (for example, sodium silicofluoride as in the following formula) designed to produce a gradual reaction therewith, thereby gradually increasing the viscosity of the slurry until it hardens:

$$2Na_2OnSiO_2 + Na_2SiF_6 = (n+1)SiO_2 + 6NaF.$$

The DPT is decomposed by some hydrolyzed silicofluoride of an alkali metal, for example, thus evolving $N_2$ gas. The offensive odor of formaldehyde and the like that remain after the decomposition is eliminable by means of a ureal substance as previously mentioned, according to the methylol forming reaction:

$$NH_2CONH_2 + H \cdot CHO = NH_2CONH-CH_2OH.$$

The foaming and hardening reactions in the above mentioned slurry proceed at a rate depending upon the temperature of the slurry. For the best results, therefore, the temperature of the prepared slurry should be under careful control. In order to practice the process of this invention at locations of low ambient temperature, the slurry may be agitated at a temperature of not less than approximately 60°C in order to accelerate its foaming reaction, and may be poured in place about five minutes before it starts solidifying. Alternatively, the slurry may be stirred at an unelevated temperature and heated after being spread (by blowing, for example) on desired surfaces.

For the preparation of such a slurry and the formation of a foam in accordance with the present invention, a first aqueous solution may be prepared which includes sodium silicate, together with or without a desired powdered material, and a second solution which includes water, the foaming agent, the DPT, the ureal substance, and a substance that will produce a gradual reaction with the alkali silicate. The first and second solutions may then be either blown or cast, as desired. Three or more solutions may also be prepared.

At least theoretically, the slurry can be kept at any temperature less than the boiling point thereof. When heated up to the boiling point the slurry will have its foaming and hardening reactions completed at that elevated temperature, thus providing defective products which have undesirably large gas bubbles formed therein. It has been discovered that an aqueous solution of an alkali silicate, of 38°Be, for example, boils at 104°C at a pressure of 760 mm. of mercury, and that an aqueous solution of an alkali silicate of 58°Be boils at 112°C at the same pressure.

The boiling point of the alkali silicate slurry may be artificially elevated by various means, such as by the addition of sodium bicarbonate or like substances that are capable of raising its boiling point.

The boiling point of the slurry being thus susceptible to change, it may be kept at various temperatures within the undetermined upper limit. My own experiments, however, have so far proved that the slurry temperature should be kept at less than about 100°C, or more specifically between about 30° and 95°C, for the best results. The aforementioned undesired decomposition residuums of DPT can be removed by evaporation when the slurry is kept at a temperature of, say, 85°C or thereabouts for its foaming and hardening reactions.

The present invention will now be described in terms of some examples thereof, which, however, are intended only to illustrate and not to impose limitations on the scope of the present invention.

Example I

Sodium silicate (molar ratio 3.7, specific gravity 1.4) — 3 Kg
Foaming agent — 0.010 Kg
DPT — 0.025 Kg
Sodium silicofluoride — 0.450 Kg
Powdered quartz (300 mesh) — 1.600 Kg
Silica fibers (1 - 2M) — 0.060 Kg
Water — 0.250 Kg A slurry of the above mixture was agitated for about 2 minutes at a temperature of about 64°C. The slurry was then poured into a mold, and then allowed to stand for about 24 hours. The foamed product so obtained exhibited a bulk specific gravity of about 0.42.

Example II

Sodium silicate (molar ratio 3.2, specific gravity 1.4) — 3 Kg
Foaming agent — 0.010 Kg residuums of Example
DPT — 0.025 Kg
Sodium silicofluoride — 0.450 Kg
Asbestos — 0.060 Kg
Water — 0.150 Kg A slurry containing the above substances was agitated for about 2.5 minutes at about 55°C, and then poured into a mold. It was succeedingly foamed and hardened within a chamber in which the temperature was maintained at an unvarying 85°C, during which step the decomposition residuumsof the DPT were removed with water vapor by evaporation. In 1 hour the mold was carried out of the chamber, and the hardened foam taken out of the mold was dried in a temperature range of from about 90° to 150°C. The bulk specific gravity of this product was about 0.28.

EXAMPLE III

Sodium silicate (molar ratio 3.7, specific gravity 1.4) — 3 Kg
Foaming agent — 0.015 Kg
DPT — 0.030 Kg
Urea — 0.030 Kg
Sodium silicofluoride — 0.450 Kg
Amosite fibers — 0.060 Kg
Water — 0.200 Kg A slurry of the above mixture was agitated for about 3 minutes at about 60°C, and then poured into frames that have been installed on the site of the operation. The slurry was then allowed to stand for one hour to be foamed and hardened. Succeedingly dried at about 22°C, the foam was here obtained as a heat insulating layer which had a bulk specific gravity of about 0.25 and which could withstand a temperature of up to about 700°C. Example EXAMPLE IV The slurry of Example III was poured into a mold, and was foamed and hardened at about 60°C. Upon removal from the mold, the foam was rinsed with water and then dried. A very lightweight product, with a bulk specific gravity of about 0.18, was then obtained. This Example is most suitable for foam manufacture at factories.

Example V

Sodium silicate (molar ratio 3.1, specific gravity 1.4) — 3 Kg
Foaming agent — 0.010 Kg
DPT — 0.030 Kg
Urea — 0.030 Kg
Asbestos — 0.060 Kg
Sodium silicofluoride — 0.450 Kg
Water — 0.350 Kg A slurry including the mixture of the foregoing substances was agitated for about 3 minutes at about 61°C and immediately poured into a mold at about 23°C. At the same temperature the slurry was foamed and hardened in 60 minutes. Upon removal from the mold, the foam was dried in a temperature range of from about 90° to 150°C, to obtain a white-colored product with a bulk specific gravity of about 0.21 and with gas bubbles as fine as about 0.1 to 0.5 millimeters in diameter. Capable of withstanding a temperature of up to about 700°C, the product proved to have immense utility as a heat insulating material. This Example also is suited for practice at factories.

Example VI

The foam obtained according to Example I was sufficiently rinsed with water, suitably dried, and baked at about 700°C. The foam so treated, now having a bulk specific gravity of about 0.22, had its heat resistivity further improved.

Although the invention has been hereinabove described in specific aspects thereof, it will be obvious to those skilled in the art that various modifications thereof may be resorted to in a manner limited only by a just interpretation of the appended claims.

I claim:

1. A process for the manufacture of a foam which comprises the steps of:
   slurrying with water an alkali silicate, a foaming agent, dinitrosopentamethylenetetramine, and a substance which produces a gradual reaction with the alkali silicate;
   agitating said slurry;
   foaming said slurry;
   hardening said slurry; and
   drying the hardened foam.

2. A process according to claim 1, wherein the slurry is maintained at a temperature of about 85°C to foam and harden the slurry and to contemporaneously remove undesired decomposition residuums of said dinitrosopentamethylenetetramine by evaporation.

3. A process according to claim 1, wherein said slurry further includes urea or a derivative thereof capable of reacting with formaldehyde to form a methylol-containing compound.

4. A process according to claim 1, wherein said slurry further includes fibers of a substance selected from the group consisting of asbestos, glass, nylon and polypropylene.

5. A process according to claim 1, wherein said slurry further includes a powder of a substance selected from the group consisting of alumina, kaolinite, quartzite, and quartz.

6. A process according to claim 1, wherein: said substance which produces a gradual reaction with the alkali silicate is selected from the group consisting of silicofluorides of alkali metals, light burned magnesia, ammonium phosphate, and ammonium oxalate; and wherein said slurry is agitated at a temperature within the range of approximately 30°C to approximately 95°C.

7. A process according to claim 1, wherein said slurry is agitated at a temperature less than the boiling point of the slurry.

8. A process according to claim 1 which further includes the step of spreading the slurry and heating the slurry at a temperature less than its boiling point subsequent to agitating the slurry and prior to foaming the slurry.

9. A process according to claim 1 wherein said hardened foam is rinsed with water.

10. A process according to claim 8 wherein said rinsed foam is further baked.

11. The process of claim 1 wherein said slurry is maintained at a temperature of from about 30°C to about 95°C.

12. The process of claim 1 wherein the foaming agent is selected from the group consisting of linear alkyl sulfate, sodium alkylaryl sulfonic acid, sodium dodecylbenzene sulfonic acid, and an ester of fatty acid.

13. The process of claim 1 wherein the alkali silicate is sodium silicate having a ratio of $Na_2O$ to $SiO_2$ ranging between about 1:2 to about 1:4.2.

14. The process of claim 1 wherein the dinitrosopentamethylenetetramine is present in an amount ranging from about 8.3% to 10% by weight based on the weight of the silicate.

15. The process of claim 1 wherein the slurry is prepared by admixing a first solution of alkali silicate and water and a second solution of water in admixture with the foaming agent, dinitrosopentamethylenetetramine, and a substance which produces a gradual reaction with the alkali silicate.

16. The process of claim 1 wherein the foam is dried at a temperature ranging from about 90° to 150°C.

* * * * *